(12) United States Patent
Krafcik et al.

(10) Patent No.: US 6,316,540 B1
(45) Date of Patent: Nov. 13, 2001

(54) HYDROPHILICALLY END-CAPPED POLYURETHANE THICKENERS

(75) Inventors: Randolph B. Krafcik, Aurora; Revathi Tomko, North Olmsted; Paul M. Kayima, Strongsville; Anthony B. Sharrotta, Aurora; Hyeong-Chan Youn, Cleveland, all of OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 09/538,192

(22) Filed: Mar. 30, 2000

Related U.S. Application Data

(63) Continuation-in-part of application No. 08/973,723, filed as application No. PCT/US96/09514 on Jun. 6, 1996, now abandoned.

(51) Int. Cl.[7] ............... C08J 3/00; C08K 3/20; C08L 75/00; C08G 18/00; C08G 18/10

(52) U.S. Cl. ............ 524/590; 524/589; 524/839; 524/840; 524/591; 528/44; 528/59; 528/60; 528/61; 528/65; 528/66; 528/76; 528/77; 528/85

(58) Field of Search ................... 524/589, 590, 524/591, 839, 840; 528/44, 59, 60, 61, 65, 66, 76, 77, 85

(56) References Cited

U.S. PATENT DOCUMENTS 3,607,822 * 9/1971 Nishino .
3,923,926 * 12/1975 Harada et al. .

* cited by examiner

*Primary Examiner*—Patrick D. Niland
(74) *Attorney, Agent, or Firm*—Vivien Y. Tsang; Robert E. McDonald

(57) ABSTRACT

This invention relates to polyurethane thickeners having particular utility in paints and coatings comprising the reaction product of an isocyanate functional material, a polyether polyol, and a difunctional hydrophilic endcapping material that is reactive with isocyanates.

20 Claims, No Drawings

HYDROPHILICALLY END-CAPPED POLYURETHANE THICKENERS

This application is a continuation-in-part of application Ser. No. 08/973723 filed May 12, 1998, now abandoned which is a 317 of PCT/US96/09514 Jun. 6, 1996.

BACKGROUND OF THE INVENTION

This invention relates to hydrophilically end-capped polyurethane thickeners having particular utility in paints, coatings and other aqueous systems.

Thickeners have been known for use in paints and coatings for many years. They can be naturally occurring or synthetically manufactured. Examples of naturally occurring thickeners include alginates, casein, gum karaya, locust bean gum, cellulosics such as methyl cellulose, hydroxyethyl cellulose and hydroxypropylmethyl cellulose.

Examples of synthetic thickeners include the compositions of U.S. Pat. Nos. 4,079,028 (Emmons et al.), 4,180,491 (Kim et al.), 4,327,008 (Schimmel et al.), 4,373,083 (Seiner et al.), 4,426,485 (Hoy et al.), 4,436,862 (Tetenbaum et al.), 4,496,708 (Dehm et al.) and 4,514,552 (Shay et al.).

U.S. Pat. No. 4,079,028 purports to teach latex systems containing a low molecular weight polyurethane thickener characterized by at least three hydrophobic groups interconnected by hydrophilic polyether groups.

U.S. Pat. No. 4,180,491 purports to teach nonionic polyurethane thickeners for print pastes, which thickeners are characterized by a molecular weight of at least 10,000 and having at least three hydrophobic branching groups linked through hydrophilic polyether segments.

U.S. Pat. No. 4,327,008 purports to teach rheology modifiers useful in water-based and organic solvent-based compositions, which modifiers are derived from the reaction of polyalkylene oxide, polyfunctional material (such as polyol, amine, amine alcohol, thiol or polyisocyanate), diisocyanate, water and a monofunctional active hydrogen-containing compound or monoisocyanate.

U.S. Pat. No. 4,373,083 purports to teach a process for making rheology modifiers (particularly those of U.S. Pat. No. 4,079,028) useful in water and organic solvent-based compositions, which modifiers are derived from the reaction of polyalkylene oxide, polyfunctional material (such as polyol, amine, amine alcohol, thiol or polyisocyanate), diisocyanate, water and end-capping compounds in an organic solvent.

U.S. Pat. No. 4,426,485 purports to teach water soluble, thickeners for aqueous systems which are characterized by deliberate, arranged bunches of hydrophobes bonded to a water-soluble backbone.

U.S. Pat. No. 4,436,862 purports to teach thickeners composed of a clay stabilizer and a water-dispersable polyurethane.

U.S. Pat. No. 4,496,708 purports to teach water-soluble comb polyurethane thickeners having hydrophilic polyether backbones and pendant monovalent hydrophobic groups.

U.S. Pat. No. 4,514,552 purports to teach alkali soluble thickeners which are aqueous emulsion copolymers of a,b-monoethylenically unsaturated carboxylic acid, monoethylenically unsaturated monomer (such as ethyl acrylate), nonionic urethane monomer which is the reaction product of a monohydric surfactant and a monoisocyanate, and optionally a polyethylenically unsaturated monomer.

In contrast to the above, the present invention relates to hydrophilically end-capped polyurethane thickener compositions which are particularly suited for use in paint and coating compositions. Whereas the patents discussed above all teach the use of hydrophobic end-capping groups to attain thickening efficiency, the present invention utilizes hydrophilic end groups.

SUMMARY OF THE INVENTION

As stated above, the present invention relates to hydrophilically end-capped polyurethane thickener compositions. In particular, the compositions of this invention are the reaction product of:

(1) the reaction product of an isocyanate starting material, preferably a diisocyanate, (2) a polyether polyol, preferably a polyalkylene oxide such as polyethylene glycol having a molecular weight between about 1000 and about 20,000, and (b) a linear difunctional hydrophilic endcapping material other than a polyether polyol that is reactive with isocyanate groups, preferably a C4–C20 linear diol having hydroxy groups which are positioned at or near the ends of the diol chain.

The compositions of this invention can be linear structures. The compositions of this invention are excellent thickeners and rheology modifying agents. These compositions are characterized by hydrophilic end caps which provide a definite and desirable impact on the compositions rheology modifying properties.

DETAILED DESCRIPTION OF THE INVENTION

As stated above, the compositions of this invention are hydrophilically-modified polyurethane thickeners which are the reaction product of:

(a) (1) the reaction product of an isocyanate starting material, preferably a diisocyanate, (2) a polyether polyol, preferably a polyalkylene oxide such as polyethylene glycol having a molecular weight between about 1000 and about 20,000, and (b) a linear difunctional hydrophilic endcapping material other than a polyether polyol that is reactive with isocyanate groups, preferably C4–C20 linear diol having hydroxy groups which are positioned at or near the ends of the diol chain.

The first starting material, an isocyanate-starting material, can be aliphatic, cycloaliphatic or aromatic, and may be used singly or in combination with other isocyanate-functional materials. The isocyanate-starting material should have at least two or more reactive isocyanate groups. Exemplary diisocyanates include the aliphatic, cycloaliphatic and aromatic diisocyanates either alone or in admixture. Generally, such diisocyanates have the formula OCN—R—NCO where R is arylene (e.g. phenylene and diphenylene), alkylarylene (e.g. dimethylbiphenylene, methylenebisphenyl and dimethylmethylenebisphenylene), alkylene (e.g. methylene, ethylene, tetramethylene, hexamethylene, a 36 methylene species, and trimethylhexylene), and acyclic (e.g. isophorone and methylcyclohexylene. Or, R can be a hydrocarbon group containing ester or ether linkages. Specific examples of such diisocyanates include 1,4-tetramethylene diisocyanate, 1,6-hexamethylene diisocyanate, 2,2,4-trimethyl-1,6-diisocyanato hexane, 1,10-decamethylene diisocyanate, 1,4-cyclohexylene diisocyanate, 4,4'-methylene bis(isocyanato cyclehexane), p-phenylene diisocyanate, 2,6-toluene diisocyanate, 2,4-toluene diisocyanate, xylene diisocyanate, isophorone diisocyanate, bis para-isocyanato cyclohexylmethane, 4,4-biphenylene diisocyanate, 4,4-methylene diphenyl isocyanate, 1,5-naphthalene diisocyanate, benzene 1,3-bis (1-isocyanato-1-methylethyl) and 1,5-tetrahydronaphthalene diisocyanate. If producing a branched composition, suitable triisocyanates include aromatic triisocyanate adduct of trimethylol propane and tolylene diisocyanate sold under the brand name Mondur CB-75, and aliphatic triisocyanate product of the hydrolytic trimerization of 1,6-hexamethylene diisocyanate, sold under the brand name Desmodur N.

Most preferred are dicyclohexylmethane-4,4'-diisocyanate sold under the brand name Desmodur W, isophorone diisocyanate, diphenylmethane-4,4'-diisocyanate sold under the brand name Mondur XP744 and isocyanurate trimer of hexamethylene diisocyanate sold under the brand name Desmodur N-3300.

The isocyanate-starting material should be used in an amount of between about 30.0% to about 50.0% (molar percent of all reactants), preferably between about 35.0% to about 45.0%.

The second starting material, the polyether polyol, is preferably a polyalkylene oxide such as polyethylene glycol having a molecular weight between about 1000 and about 20,000. Suitable materials include the adducts of an aliphatic, cycloaliphatic or aromatic polyhydroxy compound such as a polyhydric alcohol or polyhydric alcohol ether and an alkylene oxide such as ethylene oxide or propylene oxide. Or, they may be hydroxyl-terminated prepolymers of such adducts and an organic polyisocyanate. Mixtures of two or more such materials are also acceptable. Polyhydric alcohols include not only the simple glycols such as ethylene glycol, polyethylene glycol, propylene glycol and polypropylene glycol, but also hydroxy compounds having three or more hydroxyl groups such as polyalkylolalkanes (e.g. trimethylolpropane, pentaerythritol) and polyhydroxyalkanes (e.g. glycerol, erythritol, sorbitol, mannitol, and the like). Most preferred are the polyethylene and polypropylene oxides having molecular weights of between about 4,000 and about 20,000. Most preferred is polyethylene glycol having a molecular weight of about 8,000.

The polyether polyol component should be used in an amount of between about 14.0% to about 35.0% (molar percent of all reactants), preferably about 17.5% to about 25.0%.

The third starting material is a linear difunctional hydrophilic endcapping material other than a polyether polyol that is reactive with isocyanate groups. It is preferably either a C4–C20 linear diol wherein the hydroxy groups are positioned at or near the ends of the diol chain or a di-functional amine wherein the amino groups are positioned at or near the ends of the diamine chain.

For example, although 1,2-hexanediol is readily commercially available, it is not acceptable for use herein due to the positioning of the hydroxy groups on the adjacent C1 and C2 carbons. Instead, diols such as 1,6-hexanediol and 1,10-decanediol are highly preferred. These diols have the hydroxy groups positioned on the terminal carbon atoms (C1, C6 and C1, C10 respectively). Unlike the 1,2-hexanediol, which results in a thickener which has a pendant five carbon chain as shown in FIG. 1, the use of 1,6-hexanediol results in a hydroxy-terminated polymer having a six carbon chain included in the backbone as shown in FIG. II.

FIG. 1:

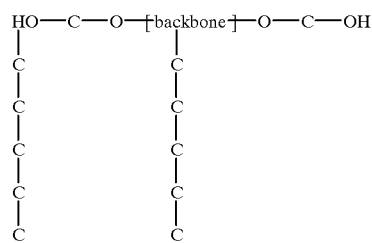

FIG. II:

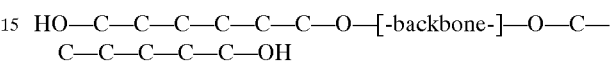

Diamines which are acceptable for use herein include 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 4,4'-diaminodicyclohexylmethane and mixtures thereof.

Also suitable for use as the hydrophilic endcapping material are the dithiols, dicarboxylic acids and bisepoxies having functionality at or near the end of their respective chains. For example, useful dithiols include 1,4-butanedithiol, 1,15-pentanedithiol, 1,6-hexanedithiol, 1,7-heptanedithiol, 1,8-octanedithiol, 1,9-nonanedithiol and 1,10-decanedithiol. Useful dicarboxylic acids include 1,4-butanedicarboxylic acid, 1,5-pentanedicarboxylic acid, 1,6-hexanedicarboxylic acid, 1,7-heptanedicarboxylic acid, 1,8-octanedicarboxylic acid, 1,9-nonanedicarboxylic acid and 1,10-decanedicarboxylic acid. Useful diepoxy compounds include 1,4-butanediol diglycidyl ether, 1,5-pentanediol diglycidyl ether, 1,6-hexanediol diglycidyl ether, 1,7-heptanediol diglycidyl ether, 1,8-octanediol diglycidyl ether, 1,9-nonanediol diglycidal ether, 1,10-decanediol diglycidal ether and bisphenol A diepoxide.

The hydrophilic endcapping material is preferably used in an amount of between about 4.5% and about 40.0% (molar percent of all reactants), preferably between about 30.0% and about 39.0%.

The following represents one preferred procedure for producing the compositions of this invention. It should be appreciated that additional procedures are available and can be adapted to provide the compositions of this invention. It should be further appreciated that the selection of individual starting materials can and will have unique effects upon the reaction parameters. One of ordinary skill in the art should be able to appreciate and compensate for these effects.

General Reaction Procedure

The preferred reaction procedure comprises charging the polyether polyol to a reactor equipped with a nitrogen blanket along with an optional, though preferred, solvent. The solvent should be selected so as to be nonreactive with the isocyanate-functional material. It should be compatible with the polyether polyol material and capable of dissolving the resultant urethane products. Suitable solvents include benzene, toluene, xylene, and other well-known non-active hydrogen solvents high in aromatic hydrocarbon contents such as Solvesso® 100 and Solvesso® 150, ethyl acetate, butyl acetate, and dialkyl ethers of alkylene glycol, dialkylene glycol, dipropyleneglycol monomethyletheracetate, N-methylpyrrolidone and the like.

The polyether polyol should be stirred and heated to about 100–120° degrees C. Any residual water in the reaction vessel or reactants should be azeotropically removed at this time. The temperature of the reactor is then reduced to a temperature of about 65–75° degrees C. and the isocyanate-functional material is added, followed by a catalyst such as dibutyl tin dilaurate. The polymerization is carried out over a time period of about three hours and the percent of free isocyanate is about 0.3–0.6% by weight of reaction mixture present. If desired, a diol can be added to the reaction mixture along with the polyether polyol and isocyanate-starting materials to provide hydrophobic moieties along the polymer backbone.

The polyether polyol, the isocyanate-starting material and the optional diol undergo a polymerization reaction to build a compound with an average molecular weight distribution of between about 10,000 and about 30,000 (Mn by gel permeation chromatography). The molecular weight of the compound is partially controlled by the ratio of equivalents of OH:NCO of the starting materials. Higher molecular weight polymers are produced when the OH:NCO ratio approaches 1:1.

In a separate container, blend the hydrophilic endcapper along with an optional solvent selected from the group described above, such as toluene. This mixture is added quickly to the reaction vessel, preferably over a time period of less than about five minutes. Hold the reaction temperature at 65–75° degrees C. for about one hour and thirty minutes or until the percent of free isocyanate is about 0%. The actual amount of free isocyanate left after the polymerization is dependent upon the level of endcapping material added to the reaction vessel. Preferably, the hydrophilic endcapping material is present in a sufficient quantity so as to provide about twice the number of equivalents as are required to theoretically react all of the isocyanate-groups. This ensures that all molecules are terminated with the hydrophilic material.

At the end of the reaction, the solvent can be removed by standard methods known in the industry and the thickener can be diluted to the desired solids level in Butyl Carbitol® and water.

The following examples are intended to exemplify this invention. They are not intended to limit the scope of this invention.

EXAMPLE

A series of thickener compounds were produced according to the above procedure with varying levels of materials as follows (solvents and their quantities not included in table):

THICKENER REACTANT COMPOSITIONS
(IN NUMBER OF EQUIVALENTS x100)

| Ex. No. | Backbone Stage | | | Endcapping Stage | |
|---|---|---|---|---|---|
| | PEG8000 | 1,6 DIOL | NCO | 1,10 DIOL | 1,6 DIOL |
| 1 | 6 | 0 | 14 | 16 | 0 |
| 2 | 6 | 0 | 14 | 16 | 0 |
| 3 | 6 | 0 | 14 | 16 | 0 |
| 4 | 6 | 0 | 14 | 16 | 0 |
| 5 | 4.5 | 1.5 | 14 | 16 | 0 |
| 6 | 3 | 3 | 14 | 16 | 0 |
| 7 | 4.5 | 1.5 | 14 | 0 | 16 |
| 8 | 4.5 | 3 | 14 | 0 | 14.5 |
| 9 | 4.5 | 4.5 | 14 | 0 | 13.0 |
| 10 | 4.5 | 3 | 14 | 0 | 14.5 |
| 11 | 4.5 | 3 | 14 | 0 | 14.5 |
| 12 | 4.5 | 3 | 14 | 7.25 | 7.25 |
| 13 | 4.5 | 3 | 14 | 3.6 | 10.9 |

Where: PEG8000 is polyethylene glycol (Mw approx. 8,000)

1,6 DIOL is 1,6-hexanediol

NCO is Desmodur W® (dicyclohexylmethane-4,4'-diisocyanate)

1,10 DIOL is 1,10-decanediol

Each of the above compounds was added to an exterior gloss latex paint in an amount of lbs thickener (20% solids) per 100 gallons paint. Additionally, three batches of the same paint are prepared each using one of three commercially available thickeners: EXP-300™ from Rohm Haas, RM-1020 from Rohm & Haas and SCT-275 from Union Carbide Corp. Paint viscosities are measured after 24 hours (except as noted below) by a Stormer viscometer (50 to 200 sec$^{-1}$ shear Krebs Units) and a cone and plate rheometer (10,000 sec$^{-1}$ shear rate) and tabulated as follows:

| EX. | KU | High Shear Visc (10,000 sec$^{-1}$) |
|---|---|---|
| 1 | 107 | 1.75 |
| 2 | 110 | 2.00 |
| 3 | 108 | 1.92 |
| 4 | 106 | 1.88 |
| 5 | 113*** | 1.80*** |
| 6 | 102*** | 2.10*** |
| 7 | 100 | 1.90 |
| 8 | 102 | 1.72 |
| 9 | 110 | 1.82 |
| 10 | 104 | 1.60 |
| 11 | 104 | 1.60 |
| 12 | ### | ### |
| 13 | ### | ### |
| EXP-300 | 109 | 1.72 |
| RM-1020 | 95 | 1.5 |
| SCT-275 | 122 | 1.90 |

***Tested "off-the-mill" immediately after preparation
Not tested in this formula Each of the above compounds was also added to an interior semi-gloss latex paint in an amount of 25 lbs thickener (20% solids) per 100 gallons paint. Additionally, three batches of the paint were prepared each using one of three commercially available thickeners: EXP-300 from Rohm & Haas, RM-1020 from Rohm & Haas and SCT-275 from Union Carbide Corp. Paint viscosities were measured after 24 hours by a Stormer viscometer (50 to 200 sec$^{-1}$ shear rate, Krebs Units) and a cone and plate rheometer (10,000 sec$^{-1}$ shear rate) and tabulated as follows:

| EX. | KU | High Shear Visc (10,000 sec$^{-1}$) |
| --- | --- | --- |
| 1 | 91 | 0.98 |
| 2 | 94 | 0.92 |
| 3 | 86 | 1.92 |
| 4 | 89 | 1.88 |
| 5 | 97 | 1.05 |
| 6 | 95 | 0.80 |
| 7 | 82 | 0.72 |
| 8 | 85 | 0.75 |
| 9 | 89 | 0.85 |
| 10 | 85 | 0.72 |
| 11 | 85 | 0.68 |
| 12 | 90 | 0.88 |
| 13 | 86 | 0.78 |
| EXP-300 | 86 | 0.90 |
| RM-1020 | 71 | 0.70 |
| SCT-275 | 94 | 1.05 |

What is claimed is:

1. A thickener composition comprising the reaction product of
   (a) a polymerization reaction product of:
      (1) an isocyanate starting material,
      (2) a polyether polyol; and
   (b) a linear difunctional hydrophilic endcapping material other than a polyether polyol that is reactive with isocyanate groups, and wherein said linear difunctional hydrophilic endcapping material is present in a sufficient quantity so as to provide about twice the number of equivalents as are required to theoretically react all of the isocyanate-groups.

2. The thickener composition of claim 1 wherein said isocyanate starting material is a diisocyanate or triisocyanate.

3. The thickener composition of claim 2 wherein said polyether polyol of the polymerization reaction product is a polyalkylene oxide having a number average molecular weight between about 1000 and about 20,000.

4. The thickener composition of claim 3 wherein said linear difunctional hydrophilic endcapping material is selected from the group consisting of C4–C20 diols, diamines, dithiols, dicarboxylic acids, diepoxies, and mixtures thereof wherein said endcapping material has isocyanate-reactive groups positioned at the end of the chain.

5. The thickener composition of claim 4 wherein said linear difunctional hydrophilic endcapping material is selected from the group consisting of 1,6-hexanediol, 1,10-decanediol, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 4,4'-diaminodicyclohexylmethane, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,4butanedicarboxylic acid, 1,5-pentanedicarboxylic acid, 1,6-hexanedicarboxylic acid, 1,7-heptanedicarboxylic acid, 1,8-octanedicarboxylic acid, 1,9-nonanedicarboxylic acid, 1,10decanedicarboxylic acid, 1,4-butanediol diglycidal ether, 1,5-pentanediol diglycidal ether, 1,6-hexanediol diglycidal ether, 1,7-heptanediol diglycidal ether, 1,8-octanediol diglycidal ether, 1,9-nonanediol diglycidal ether, 1,10-decanediol diglycidal ether, bisphenol A diepoxide, and mixtures thereof.

6. The thickener composition of claim 2 wherein said isocyanate starting material is selected from the group consisting of dicyclohexylmethane-4,4'-diisocyanate, isophorone diisocyanate, diphenylmethane-4,4'-diisocyanate and isocyanurate trimer of hexamethylene diisocyanate.

7. The thickener composition of claim 3 wherein said polyether polyol of the polymerization reaction product is selected from the group consisting of alkylene oxide adducts of an aliphatic, cycloaliphatic or aromatic polyhydroxy compound the hydroxyl-terminated prepolymers of an alkylene oxide adducts and an organic polyisocyanate, or mixtures thereof, polyalkylolalkanes and polyhydroxyalkanes.

8. The thickener composition of claim 7 wherein said polyether polyol of the polymerization reaction product is selected from the group consisting of polyethylene oxides and polypropylene oxides having number average molecular weights of between about 4,000 and about 20,000.

9. The thickener composition of claim 8 wherein said polyether polyol of the polymerization reaction product is polyethylene glycol having a number average molecular weight of between about 4,000 and about 12,000.

10. A thickener composition comprising a reaction product of:
    (a) a polymerization reaction product of:
       (1) an isocyanate starting material, and
       (2) a polyether polyol, and
       (3) a diol;
    (b) a linear difunctional hydrophilic endcapping material other than a polyether polyol that is reactive with isocyanates, and wherein said difunctional hydrophilic endcapping material is present in a sufficient quantity so as to provide about twice the number of equivalents as are required to theoretically react all of the isocyanate-groups.

11. The thickener composition of claim 10 wherein said isocyanate starting material is a diisocyanate or triisocyanate.

12. The thickener composition of claim 11 wherein said polyether polyol of the polymerization reaction product is a polyalkylene oxide having a number average molecular weight between about 1000 and about 20,000.

13. The thickener composition of claim 12 wherein said difunctional hydrophilic endcapping material is selected from the group consisting of C4–C20 diols, diamines, dithiols, dicarboxylic acids, diepoxies, and mixtures thereof wherein said endcapping material has isocyanate-reactive groups positioned at the end of the chain, thereof.

14. The thickener composition of claim 13 wherein said difunctional hydrophilic endcapping material is selected from the group consisting of 1,6-hexanediol, 1,10-decanediol, 1,4-diaminobutane, 1,5-diaminopentane, 1,6diaminohexane, 1,7-diaminoheptane, 1,8-diaminooctane, 1,9diaminononane, 1,10-diaminodecane, 1,12-diaminododecane, 4,4'-diaminodicyclohexylmethane, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,4-butanedicarboxylic acid, 1,5-pentanedicarboxylic acid, 1,6-hexanedicarboxylic acid, 1,7-heptanedicarboxylic acid, 1,8-octanedicarboxylic acid, 1,9-nonanedicarboxylic acid, 1,10-decanedicarboxylic acid, 1,4-butanediol diglycidal ether, 1,5-pentanediol diglycidal ether, 1,6-hexanediol diglycidal ether, 1,7-heptanediol diglycidal ether, 1,8-octanediol diglycidal ether, 1,9-nonanediol diglycidal ether, 1,10-decanediol diglycidal ether, bisphenol A diepoxide, and mixtures thereof.

15. The thickener composition of claim 11 wherein said isocyanate starting material is selected from the group consisting of dicyclohexylnethane-4,4'-diisocyanate, isophorone diisocyanate, diphenylmethane-4,4'diisocyanate and isocyanurate trimer of hexamethylene diisocyanate.

16. The thickener composition of claim 14 wherein said polyether polyol of the polymerization reaction product is selected from the group consisting of alkylene oxide adducts of an aliphatic, cycloaliphatic or aromatic polyhydroxy compound, the hydroxyl-terminated prepolymers of alkylene oxide adducts and an organic polyisocyanate, or mixtures thereof, polyalkylolalkanes and polyhydroxyalkanes.

17. The thickener composition of claim 16 wherein said polyether polyol of the polymerization reaction product is selected from the group consisting of polyethylene oxides and polypropylene oxides having number average molecular weights of between about 4,000 and about 20,000.

18. The thickener composition of claim 17 wherein said polyether polyol of the polymerization reaction product is polyethylene glycol having a number average molecular weight of between about 4,000 and about 12,000.

19. A thickener composition comprising the reaction product of:
   (a) a polymerization reaction product of:
      (1) an isocyanate starting material, wherein said isocyanate starting material is a diisocyanate or triisocyanate; and
      (2) a polyether polyol, wherein said polyether polyol is a polyalkylene oxide having a number average molecular weight between about 1000 and about 20,000;
   (b) a linear difunctional hydrophilic endcapping material that is reactive with isocyanate groups, and wherein said linear difunctional hydrophilic endcapping material is present in a sufficient quantity so as to provide about at least twice the number of equivalents as are required to theoretically react all of the isocyanate-groups, and wherein said linear difunctional hydrophilic endcapping material is selected from the group consisting of 1,6-hexanediol, 1,10-decanediol, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 4,4'-diaminodicyclohexylmethane, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,4-butanedicarboxylic acid, 1,5-pentanedicarboxylic acid, 1,6-hexanedicarboxylic acid, 1,7-heptanedicarboxylic acid, 1,8-octanedicarboxylic acid, 1,9-nonanedicarboxylic acid, 1,10-decanedicarboxylic acid, 1,4-butanediol diglycidal ether, 1,5-pentanediol diglycidal ether, 1,6-hexanediol diglycidal ether, 1,7-heptanediol diglycidal ether, 1,8-octanediol diglycidal ether, 1,9-nonanediol diglycidal ether, 1,10-decanediol diglycidal ether, bisphenol A diepoxide, and mixtures thereof.

20. A thickener composition comprising a reaction product of:
   (a) a polymerization reaction product of:
      (1) an isocyanate starting material, wherein said isocyanate starting material is a diisocyanate or triisocyanate; and
      (2) a polyether polyol, wherein said polyether polyol is a polyalkylene oxide having a number average molecular weight between about 1000 and about 20,000; and
      (3) a diol;
   (b) a linear difunctional hydrophilic endcapping material that is reactive with isocyanate groups, and wherein said linear difunctional hydrophilic endcapping material is present in a sufficient quantity so as to provide about at least twice the number of equivalents as are required to theoretically react all of the isocyanate-groups, and wherein said linear difunctional hydrophilic endcapping material is selected from the group consisting of 1,6-hexanediol, 1,10-decanediol, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 4,4'-diaminodicyclohexylmethane, 1,4-butanedithiol, 1,5-pentanedithiol, 1,6-hexanedithiol, 1,7-heptanedithiol, 1,8-octanedithiol, 1, 9-nonanedithiol, 1,10-decanedithiol, 1,4-butanedicarboxylic acid, 1,5-pentanedicarboxylic acid, 1,6-hexanedicarboxylic acid, 1,7-heptanedicarboxylic acid, 1,8-octanedicarboxylic acid, 1,9-nonanedicarboxylic acid, 1,10-decanedicarboxylic acid, 1,4-butanediol diglycidal ether, 1,5-pentanediol diglycidal ether, 1,6-hexanediol diglycidal ether, 1,7-heptanediol diglycidal ether, 1,8-octanediol diglycidal ether, 1,9-nonanediol diglycidal ether, 1,10-decanediol diglycidal ether, bisphenol A diepoxide, and mixtures thereof.

* * * * *